United States Patent [19]
Medlin, Jr.

[11] Patent Number: 5,405,111
[45] Date of Patent: Apr. 11, 1995

[54] BRACKET FOR ANCHORING APPARATUS BETWEEN WALL STUDS

[76] Inventor: Lewis B. Medlin, Jr., Rural Rte. 3, Box 292-B, Vinton, Va. 24179

[21] Appl. No.: 139,419

[22] Filed: Oct. 20, 1993

[51] Int. Cl.⁶ ............................................... E04G 3/00
[52] U.S. Cl. .................................. 248/205.1; 248/906
[58] Field of Search ...................... 248/906, 200.1, 912, 248/909, 300, 205.1; 411/437, 386, 918

[56] References Cited

U.S. PATENT DOCUMENTS

| | | | |
|---|---|---|---|
| 1,066,706 | 7/1913 | Caine . | |
| 1,582,287 | 4/1926 | Luckwaldt et al. . | |
| 1,786,353 | 12/1930 | Logan . | |
| 2,023,083 | 12/1935 | Knell | 248/906 X |
| 2,316,389 | 4/1943 | Atkinson | 287/58 |
| 2,962,252 | 11/1960 | Frank | 248/906 X |
| 2,963,253 | 12/1960 | Maier et al. | 248/298 |
| 3,032,636 | 3/1966 | Seckinger | 248/906 X |
| 3,362,737 | 1/1968 | Cobb | 411/386 X |
| 4,603,789 | 8/1986 | Medlin, Sr. | 220/3.9 |
| 4,757,967 | 7/1988 | Delmore et al. | 248/906 X |
| 4,967,990 | 11/1990 | Rinderer | 248/906 X |
| 5,176,345 | 1/1993 | Medlin | 248/906 X |
| 5,224,673 | 7/1993 | Webb | 248/906 X |

*Primary Examiner*—Blair M. Johnson
*Attorney, Agent, or Firm*—Olive & Olive

[57] ABSTRACT

The present invention comprises a bracket adapted for installation in a building wall by attachment to adjacent studs. The bracket has a pair of mirror image end connecting portions bent so as to position the bracket between the studs and position an electrical box mounted thereon so as to be flush with a wall to be assembled subsequently to the studs. Accommodation is made to field modify the end connecting portions for electrical boxes of varying depth. The bracket has a series of holes with which to mount electrical or other apparatus with machine screws and a series of conical detents for piloting and firmly holding sheet metal screws. Variations on the main embodiment provide a bracket with oval shaped holes and detents and a bracket with detents only.

Second and third embodiments of the invention are provided; the second to accommodate the bracket to attach to adjacent studs with non-standard spacing therebetween, and the third to mount a bracket to a single stud, but not to a second stud, and having a back brace or stiffening area in right angular relation to the plane of the bracket and operative to engage a wall opposite which said bracket is mounted.

16 Claims, 3 Drawing Sheets

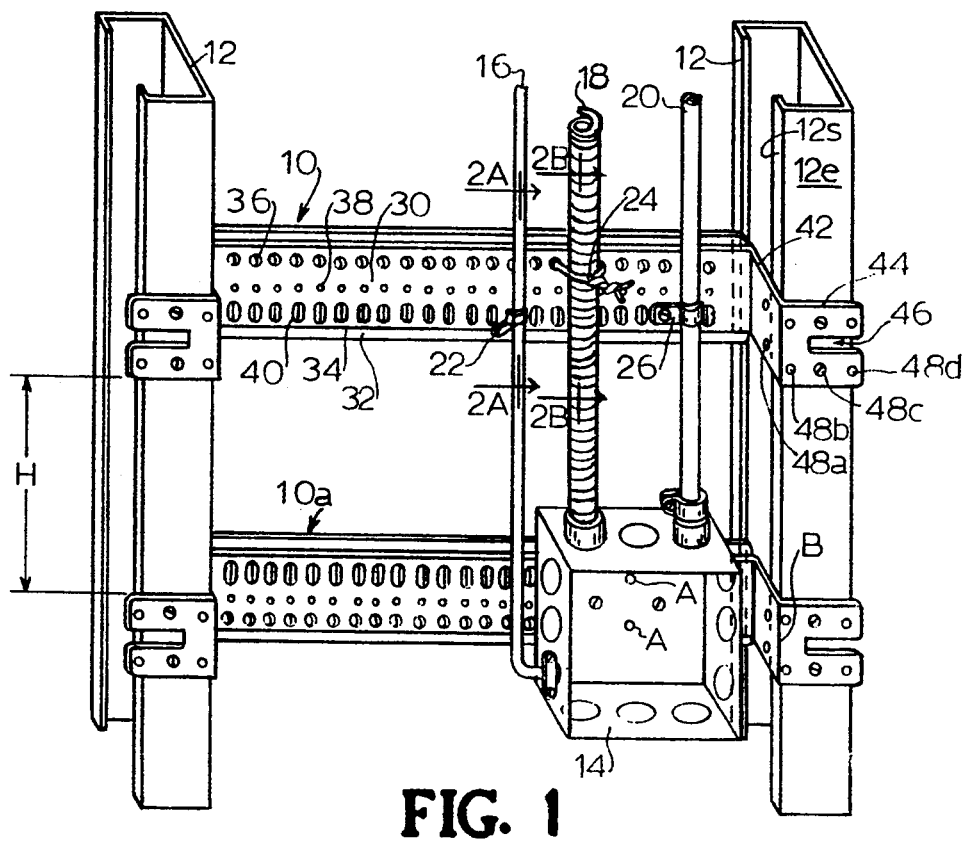
FIG. 1
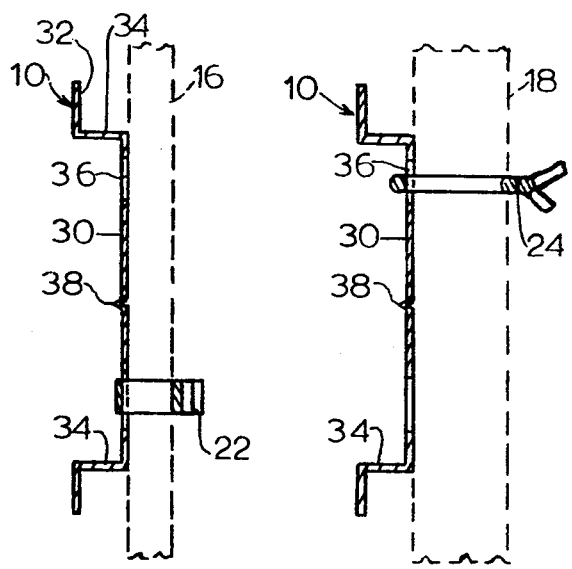
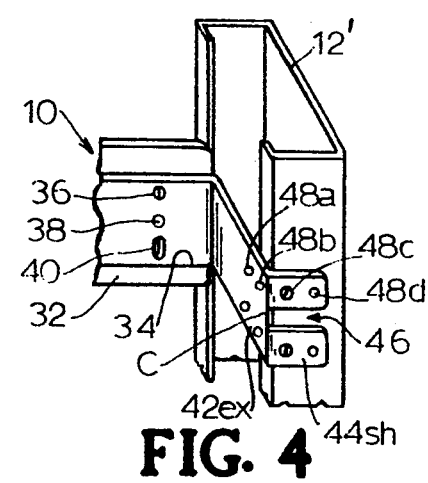
FIG. 2A   FIG. 2B   FIG. 4

BRACKET FOR ANCHORING APPARATUS BETWEEN WALL STUDS

BACKGROUND OF THE INVENTION

1. Field of the Invention

This invention relates to brackets for mounting and anchoring apparatus in a space between adjacent studs in a building wall, and especially to mounting electrical apparatus therebetween, such as an electrical outlet or junction box (hereafter referred to only as an outlet box).

2. Description of the Related Art

All buildings generally require electrical, water, air and sometimes gas supplies which are referred to as the utilities. Many sorts of utility-conveying apparatus, e.g., pipes, cables, mounting boxes, ducts, are installed in a wall during the construction of a building. The space which is generally empty between adjacent studs and between opposed wall surface boards is ideal for conveying the utility from its place of entry or generation to its place of use. The delivery of the utility to the room is typically done through a portion of the wall surface board or similar floor or ceiling surface material.

For practical reasons, and frequently for compliance with building code requirements, the conveying conduit and the room delivery port are best secured to a fixed structural component. In the case of an electrical utility, the cable or conduit and the outlet box or switch must be so secured. In some instances, it is practical to anchor the apparatus directly to a wall stud. In many cases, it is best to position the apparatus between studs, thus requiring an added support structure or bracket.

A common means of attachment of apparatus to a bracket or to a stud is by use of self-tapping sheet metal-type screws. This type screw will both thread into a drilled hole and, in the proper substrate, drill its own hole and thread into the substrate material. The self-tapping screw is used for attachment of devices to both wood and sheet metal supporting structure.

The electrical cable or conduit which is to enter an electrical outlet box must be secured to a fixed building component within twelve inches of the box, according to the National Electrical Code. A currently used method of securing such cable (which may be BX metallic sheathed, plastic sheathed or metal conduit enclosed) is shown on page 56 of the December, 1992 issue of *"Electrical Contractor"* magazine in a product note about mounting brackets. The method depicted employs a bracket having no visible punched holes in its main portion and which mounts to a pair of adjacent studs. A cable or conduit is shown tied to the longitudinal portion of a stud-mounted bracket by a flexible tie and is thus free to slide lengthwise of the bracket. While accepted in the electrical trade, this method provides little cable securement.

There have been prior brackets directed to installing and securing a device, such as an electrical box, between wall studs. One such device is disclosed in U.S. Pat. No. 4,757,967 to Delmore et al. for a BOX SUPPORT, which patent is incorporated herein by reference. The '967 patent teaches an electrical box support adapted to mount between a pair of wall studs and having a V-shape channel formed in the longitudinal central portion of its strut. The V-shape channel receives anchoring screws which act to both anchor the box and align the box on the channel. Additionally, the V-shaped channel serves to structurally strengthen the strut.

A second known prior patent is U.S. Pat. No. 4,967,990 to Rinderer for a SUPPORT FOR AN ELECTRICAL BOX, which discloses a bracket, differently formed from the '967 patent bracket, for mounting between studs, and which patent is incorporated herein by reference. Patent '990 teaches a bar having a longitudinally oriented U-shaped channel with a series of longitudinally dispersed small diameter "starter" holes formed in the bottom thereof. The starter holes permit easy alignment of the box particularly when using sheet metal screws.

Whereas the prior known brackets for mounting apparatus between studs in a building wall have addressed certain aspects of mounting apparatus, there are other considerations. One such consideration is that means other than sheet metal screws for securing apparatus to a bracket are known in the trade. Among the most economical means for attaching a cable or a conduit to a bracket are the steel wire tie and the plastic wire band. Both of these devices are cheap to purchase and are quick to use. To function adequately, the tie or band should be held in place and not be able to slide along a mounting bracket. Alternate attachment means include "U" bolts and "C"-shaped clamps. Thus, there is a need for an improved bracket suited to securely receiving steel wire ties, plastic wire bands, U-bolts, C-clamps and the like.

A further consideration in apparatus mounting in a wall is that electrical boxes are produced in two primary depths, depending upon the apparatus to be enclosed. The usual box is 1½ inches deep. An alternate, but common, box is 2⅛ inches deep. To accommodate either depth box, a bracket is needed which can mount the electrical box so that its open front face resides at a desired flush position with respect to the surface wall.

Typically, studs in a construction wall are separated by either 16 inches or 24 inches, the former for wood studs and the latter for metal studs, in general. There are situations, such as, for example, adjacent a window or door opening, where the studs are not separated by the usual space, thus needing a bracket of different length. Thus, there is a need for an improved bracket which not only meets the foregoing considerations but is also adapted to various spacing requirements.

The term "stud" as used herein is intended to include structural members in a building surface, including wall studs, joists, rafters, etc. The term "wall" as used herein is intended to include ceiling surfaces as well as vertical walls.

It is therefore an object of this invention to provide an improved bracket for mounting apparatus to a pair of adjacent studs in a building wall.

It is an additional object of the invention to provide a bracket having means to vary the mounting position for either a 1½ inch deep box or a 2⅛ inches deep box.

It is a further object of the invention to provide an improved bracket having means to securely anchor flexible ties thereto.

It is a still further object of the invention to provide an improved bracket adapted to adjust in length to accommodate different stud spacing.

Other objects and advantages will be more fully apparent from the following disclosure and appended claims.

SUMMARY OF THE INVENTION

The invention disclosed provides a novel and versatile bracket for use in mounting apparatus, particularly outlet boxes, between studs in a building wall. The bracket is intended primarily for electrical application, but is useful as well to mount plumbing or heating and air conditioning apparatus. The bracket has end portions bent to fit against and be secured to adjacent studs and a strut portion which resides perpendicular to the studs at a distance from a front edge thereof which enables the front of an electrical box to mount flush with a wall board section ultimately enclosing the studs. The typically flat base of the box is secured to the flat surface of the strut. The strut portion has a series of holes formed along each of its longitudinal edges, one series being round holes and the other series being oval holes. Between the sets of holes are a series of detents adapted for piloting the tip of a self-tapping screw at starting and providing an extended contact length for screw threads to deter stripping when installed.

BRIEF DESCRIPTION OF THE DRAWINGS

FIG. 1 is a perspective view of two apparatus attachment brackets according to a first preferred embodiment of the invention mounted to a pair of adjacent studs and to which are mounted an electrical box and a number of connected cables.

FIG. 2A is an enlarged cross sectional view of a cable shown in dashed lines attached to an apparatus bracket by means of a plastic wire band and is taken in the direction of line 2A—2A of FIG. 1.

FIG. 2B is an enlarged cross section view of a cable shown in dashed lines attached to an apparatus bracket by means of a twisted wire tie and taken in the direction of line 2B—2B of FIG. 1.

FIG. 4 is a perspective view of the mounting end of the bracket of FIG. 1 as shaped to accommodate an electrical box of greater depth than that of FIG. 1.

DETAILED DESCRIPTION OF THE INVENTION

Figure 3A:
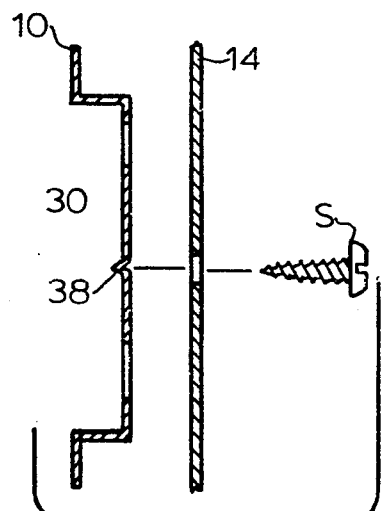
FIG. 3A is an exploded cross sectional view of a partial base portion of an electrical box positioned to be assembled to a section of the bracket of the invention by means of a self-tapping screw.

According to the objects above, the present invention provides a bracket for the versatile securement of apparatus, especially including electrical apparatus, between studs in a building wall. The bracket provided, as described more fully below, has three configurations of holes or detents which are useful for attaching the apparatus and which are positioned on a planar central strut surface. While the bracket is adapted to support any of a variety of devices, such as electrical boxes, air conditioning ducts, water pipes and valves, gas pipes and the like, the description below is directed primarily to the installation of electrical apparatus and uses as an example an electrical outlet box.

As illustrated in FIG. 1, upper bracket 10 is mounted to and between a pair of parallel, adjacent studs 12 in a skeletal building wall. Bracket 10 can be installed similarly between joists in a ceiling. An electrical box 14, typically used to enclose a switch, a receptacle, or simply a junction between wires, is mounted securely to one of the brackets 10a. The lower and upper brackets 10, 10a are separated by a distance H, sufficient so that when wires for supplying power to the apparatus to be mounted in box 14 are appropriately attached, those wires pass close to upper bracket 10 and may be affixed thereto. The distance H between adjacent brackets 10, 10a is optional, but it is typically 30 cm (12 inches). Bracket 10 and bracket 10a are identical and are referred to below generally as bracket 10.

Bracket 10 is formed with a pair of mirror image end connector means which are spaced apart either 16 inches or 24 inches, to accommodate the typical spacing of studs in a building wall. The end connectors comprise leg 42 (FIG. 1) which is a continuation of planar strut 30, formed at a forwardly extended right angle thereto, and right angled foot 44 which is a continuation of leg 42 and is outwardly facing and substantially parallel to strut 30. Foot 44 is spaced from strut 30 by approximately 38 mm (1½ inches) so that a 1½-inch deep electrical box 14 mounted thereupon will reside flush with the inner surface of a wall board (not shown) to be mounted to stud 12 with bend B positioned at a forward inner corner of the stud. Foot 44 further has gap 46 formed in its center in an orientation parallel to the long dimension of strut 30 and extending to a selected depth to be described below. Leg 42 and foot 44 are formed with several pair of opposed mounting holes 48a, 48b, 48c, 48d to accommodate fasteners used to assemble bracket 10 to studs 12. Generally, bracket 10 is attached to the forward face 12e of each stud 12, but in certain construction situations, the fastening means must be located on the lateral face 12s (FIG. 1) of stud 12, for which purpose holes 48a are positioned on the leg 42 portion.

Planar strut 30 is bordered on each of its two longitudinal edges by a flange 34 (FIGS. 1 and 2A) integrally formed perpendicular thereto. A lip 32 is formed integral with the outer edge of each flange 34 and resides in a plane parallel to the plane of strut 30. The combination of flanges 34 and lips 32, typically formed on both edges of strut 30 by bending, adds substantial structural rigidity to bracket 10.

In the illustration of FIG. 1, wire 16 is a plastic sheathed cable, wire 18 is a flexible metallic sheathed (BX) cable, and wire 20 is a rigid metallic conduit-enclosed cable. According to general practice and to typical building code requirements, all types of cables are attached to a stable member within a distance of one foot of the electrical box 14. In order to accommodate such requirement, the bracket 10 of the invention provides a series of round holes 36 along one longitudinal edge and a series of oval holes 40 along a second longitudinal edge of the strut 30. There are a number of different devices and methods used to anchor cables to a bracket 10. A common method is to wrap and twist a length of wire to form a wire tie 24 around a cable such as cable 18 and through round holes 36 in the bracket 10, as seen in FIG. 1 and in side elevation cross section in FIG. 2B. Wire tie 24 is both inexpensive to purchase and requires little time to apply. The round holes 36 are best adapted to wire tie 24 installation because of being large enough for easy insertion, and because the round shape keeps the tightened wire tie 24 from shifting along strut 30.

The long axis of oval holes 40 are oriented generally widthwise of strut 30 and are adapted for use with molded plastic wire bands 22, which are typically rectangular in cross section. A plastic band 22 is shown in FIG. 1 and in FIG. 2A holding plastic sheathed cable 16 to bracket 10 through oval holes 40.

Figures 9A, 9B, 9C:
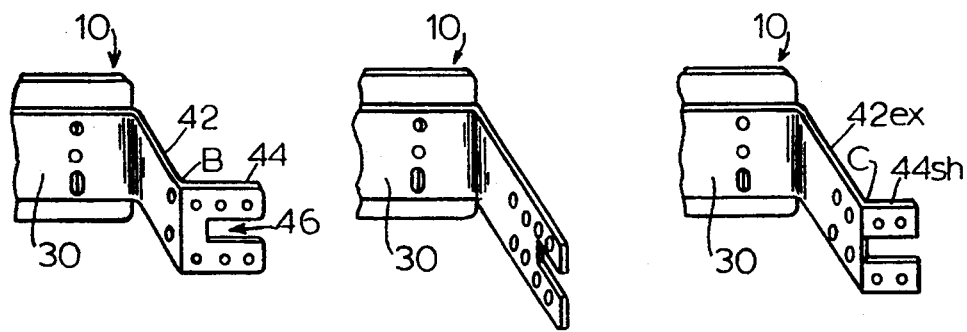
FIG. 9A, is a perspective view of an end of the bracket of FIG. 1 as typically formed.
FIG. 9B is a perspective view of the end of the bracket of FIG. 9A after being flattened.
FIG. 9C is a perspective view of the end of the bracket of FIG. 9A after being reformed.

For various electrical apparatus, an electrical box which is 2⅛ inches deep, rather than the above referred to 1½ inch depth, must be used. The procedure for modifying the depth of bracket 10 is illustrated in FIGS. 9A, 9B and 9C. In this process, the installer of bracket 10 first flattens the preformed bend B (FIG. 9A–9B) between leg 42 and foot 44 and next makes a new bend C (FIG. 9C) at the base of gap 46 which effectively forms extended leg 42ex and shortened foot 44sh to accept the 2⅛ inch deep electrical box. The depth of gap 46 is configured to serve as a guide to re-form bracket 10 at bend C with correct leg 42ex and foot 44sh dimensions. When installed on stud 12', as shown in FIG. 4, bend C resides adjacent the inner forward corner of stud 12' and bracket 10 resides 2⅛ inches behind.

Whereas leg 42 originally has one set of mounting holes 48a FIG. 4 and foot 44 has three sets of mounting holes 48b, 48c and 48d, after re-bending, extended leg 42ex has two sets of holes 48a and 48b and shortened foot 44sh has two sets of holes 48c and 48d. As re-configured and attached to stud 12', gap 46 terminates at the inner forward corner of stud 12'.

Figure 3B:
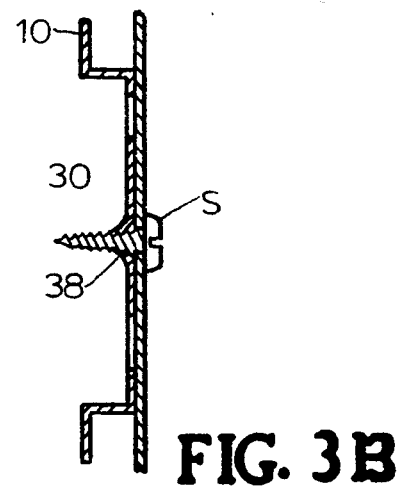
FIG. 3B is an illustration of the partial box base portion and bracket section of FIG. 3A after assembly.

A series of detents 38 are formed in the strut 30 along a line positioned parallel to and between the lines intersecting the centers of the sets of round holes 36 and oval holes 40. Detents 38 are substantially conical so as to be concave on the surface of strut 30 to which electrical apparatus is to mount and convex to the opposite surface (see FIGS. 2A and 2B). When an installer mounts an electrical box 14 (FIG. 1) or other apparatus on the face of bracket 10, it is common to use self-tapping sheet metal screws. By providing detents 38 which are concave on the side to which screws are introduced, the screw point can be placed into a detent 38 and does not tend to wander from its starting position, and so will be easily driven through the sheet material of strut 30. Whereas a conical detent is a preferred form of sheet metal screw tip receiving recess, small diameter starter holes will also perform the basic function required. The assembly of the flat base of an electrical box 14 to bracket 10 with a self-tapping screw S is illustrated in sequential FIGS. 3A (before assembly) and 3B (after assembly). An additional benefit of detents 38, as depicted in FIG. 3B, is that when screw S is threaded through bracket 10, the conical shape of detent 38 provides a thickness of gripping material greater than the thickness of initial bracket 10 so that a longer length of screw thread grips bracket 10. This results in fewer stripped holes and a more secure screw engagement. The spacing of detents 38 is adapted to match the spacing of prepunched holes in the base of the standard electrical box 14.

Electrical box 14 may optionally be assembled to bracket 10 by means of machine screws and nuts, rather than sheet metal screws. In this instance, the screws are placed through the vertically opposed holes A (FIG. 1) in the base of electrical box 14. Round holes 36 and oval holes 40 of bracket 10 are spaced apart to match holes A conventionally provided in the base of electrical box 14. A nut is used on the end of each such machine screw for securement.

The foregoing description being directed to the first preferred embodiment of the invention, that which follows describes second and third preferred embodiments, essentially being adaptations of the first. In the second embodiment, provision is made to modify the length of the bracket in the case of wall studs which are at a separation other than the standard spacing of 16 inches or 24 inches.

Figure 5A:
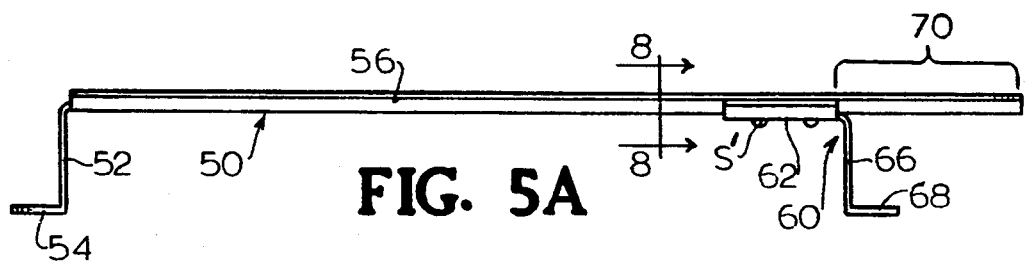
FIG. 5A is a top plan view of an adjustable length bracket of the invention according to a second preferred embodiment.
Figure 5B:
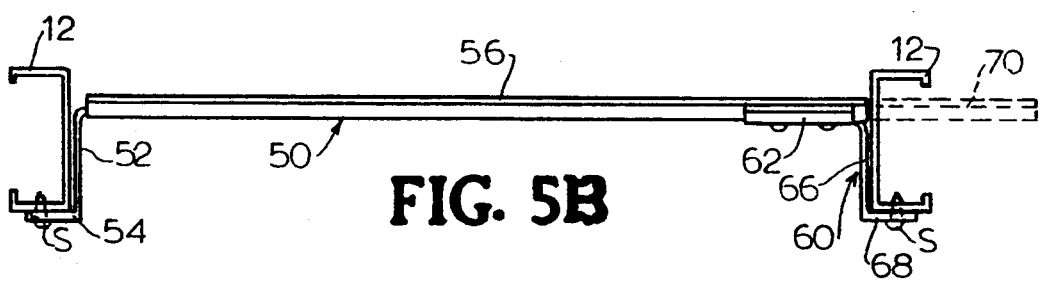
FIG. 5B is a top plan view of the bracket of FIG. 5A after being cut to length and mounted to adjacent wall studs the surplus length being shown in dashed lines.
Figure 8:
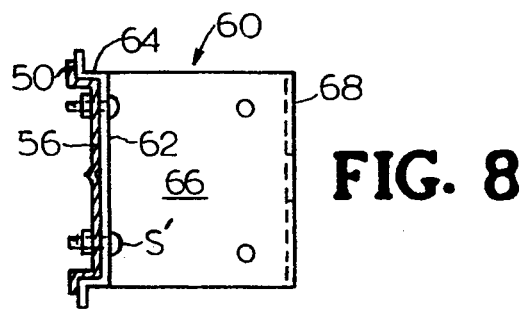
FIG. 8 is a cross sectional view of the bracket of FIG. 5A taken in the direction of line 8—8 of FIG. 5A.

Length adaptation bracket 50, illustrated in FIGS. 5A, 5B and 8, formed similarly to above-described bracket 10, comprises a longitudinal strut 56 with two series of holes and one series of detents formed therein in the manner previously described. A leg 52 and foot 54 are formed at one end of strut 56, with the opposite end of strut 56 terminating at a selected length, which is preferably greater than 24 inches. A second component used with bracket 50 is end connector 60 which is formed with a base 62 having a bend 64 and a shape similar in cross sectional shape to that of strut 56 such that base 62 can slide on strut 56. End connector 60 is short in overall length and its base 62 is slightly wider than strut 56 so as to be able to slidably mount thereon. End connector 60 also includes a leg 66 and a foot 68, formed similar to leg 42 and foot 44 of the first embodiment and configured to enable strut 56 to mount parallel to the wall board to be subsequently assembled. A series of holes and detents (not shown) are formed in base 62 of end connector 60 in positions matching similar holes formed in strut 56 to accept fastening means S' (FIGS. 5A and 8). When end connector 60 is secured to length adaption bracket 50 at a position selected to accommodate the spacing of the wall studs, surplus length 70 is removed from the end of strut 56 by sawing or other convenient means. Assembled bracket 50 is then mounted on studs 12 with fasteners S as described above and illustrated in FIG. 5B.

Figure 6:
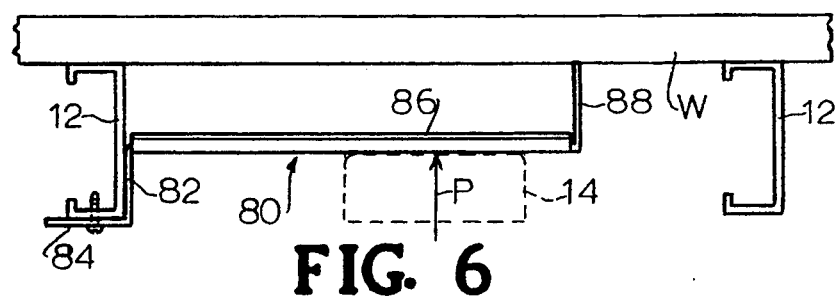
FIG. 6 is a top plan view of a bracket of the invention according to a third preferred embodiment mounted to a single stud and resting against a rear wall surface and with an electrical box (in dashed lines) assembled thereto.

In another situation sometimes encountered during the installation of electrical or other equipment, it is desired to mount a mounting bracket to a single stud without a second point of attachment. In this case, the third embodiment of this invention bracket, shown in plan view in FIG. 6, is employed. Single stud bracket 80 is formed with a strut 86 having holes and detents similar to those described above, a single leg 82 and a foot 84 for mounting to one of the adjacent studs 12. At the opposite end of strut 86, typically at a distance of less than 16 inches, is back brace 88, adapted to contact a rear wall board W. If a force, such as indicated by arrow P, is applied against an electrical box 14 (shown in dashed lines) mounted to strut 86, back brace 88 will prevent strut 86 from being moved thereby. Back brace 88 is preferably formed perpendicular to strut 86 for optimum structural support. When single stud bracket 80 is modified for use with a 2⅛ inch deep electrical box, leg 82 and foot 84 are reconfigured as described above. Back brace 88 is then bent at a 90° angle at an appropriate position to maintain strut 86 parallel to wall board W.

Figures 7A, 7B:
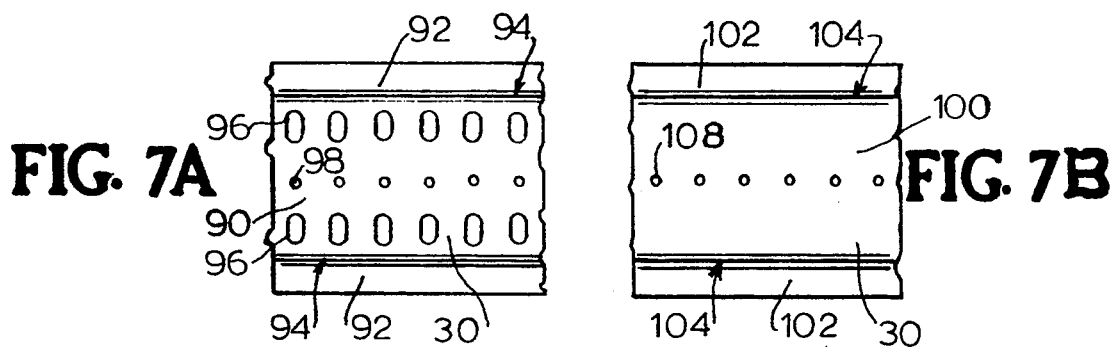
FIG. 7A is a front elevation view of a central portion of the bracket of the invention with an alternate configuration of punched holes and detents according to a fourth embodiment.
FIG. 7B is a front elevation view of a central portion of the bracket of the invention with a second alternate configuration comprising detents only according to a fifth embodiment.

As a fourth embodiment to the configuration useful in any of the first three preferred embodiments herein described, FIG. 7A illustrates an alternate pattern of holes along a segment of strut 90. In this configuration, both sets of holes 96 are formed in an oval shape for flexibility of mounting position without sacrificing fastening security. A central series of detents 98 are formed as in other configurations.

FIG. 7B shows a portion of a bracket as useful in any of the first three preferred embodiments along a strut 100. According to this fifth embodiment, no holes are formed. A series of conical detents 108 are formed into the surface of strut 100. This configuration is adapted to mounting electrical boxes and to securing wires and conduits by means of clamps, as discussed above. A further modification is to provide more than one series of detents 108.

The several forms of the invention disclosed are typically manufactured of sheet metal by metal stamping techniques as are well known. Other materials and manufacturing methods may be employed at the discretion of the maker.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

I claim:

1. A bracket for mounting apparatus within a wall between adjacent studs, comprising:
   (a) an elongated strut having two ends and a planar surface devoid of bends and adapted for mounting said apparatus;
   (b) support means at each end of said strut to support and secure said strut between said adjacent studs so that said planar surface is recessed with respect to a front surface of said studs and is positioned suitably for mounting said apparatus within said wall;
   (c) said strut having:
      (i) a series of screw tip receiving recesses formed along a first line extending lengthwise of and substantially in the middle of said planar surface;
      (ii) a first series of substantially oval holes formed along a second line extending lengthwise of said planar surface substantially parallel to and offset to one side of said first line; and
      (iii) a second series of substantially round holes formed along a third line extending lengthwise of said planar surface and substantially parallel to and offset to an opposite side of said first line;
   (d) whereby said apparatus can be mounted on and secured by fastening means to said planar surface; and
   (e) wherein said screw tip receiving recesses comprise substantially conical detents recessed rearwardly from said planar surface.

2. The bracket as claimed in claim 1 wherein each said support means comprises a leg portion formed integrally with and perpendicular to said planar surface and a foot portion formed integrally with said leg portion and parallel to said planar surface so that each said foot is directed laterally outward of said planar surface and is positioned suitably for being secured to a respective said stud.

3. The bracket as claimed in claim 1 wherein each of said holes is formed having a long axis oriented generally widthwise of said strut.

4. The bracket as claimed in claim 1 including bent portions extending rearwardly from said planar surface in perpendicular relation thereto and formed along and substantially the length of each edge of said planar surface and operative to rigidify said strut.

5. The bracket as claimed in claim 1 wherein one said support means comprises a leg portion formed integrally with and perpendicular to said planar surface and a foot portion formed integrally with said leg portion and parallel to and directed laterally outward from said planar surface and being adapted for being secured to a respective said stud and the other of said support means comprises a leg portion formed integrally with and perpendicular to and extending rearwardly of said planar surface and adapted to contact a wall board secured to said stud and thereby stiffen the support of said bracket.

6. The bracket as claimed in claim 1 wherein one said support means is formed at one end of said strut for attachment to a respective said stud and the other said support means is formed as part of an end structure slidably mounted on and securable to an opposite end of said strut to selectively lengthen and shorten the length of said bracket and having said other support means adapted for attachment to another respective said stud, thereby enabling said bracket to accommodate to both standard and non-standard spacing between adjacent studs.

7. The bracket as claimed in claim 2 wherein selected said leg and foot portions are adapted to being complementarily changed in length such that when said leg portion is of greater length said foot portion is of less length and configured such that the length of said leg portion is adapted to the depth of the apparatus being mounted on said bracket.

8. The bracket as claimed in claim 7 further comprising integrally formed guide means incorporated in each said support means and configured to enable the complementary change in length of said leg portion and said foot portion and adapted to the depth of said apparatus being mounted on said bracket.

9. The bracket as claimed in claim 1 including at least one bent portion extending rearwardly from said planar surface in perpendicular relation thereto and formed along and substantially the length of at least one edge of said planar surface and operative to rigidify said strut.

10. The bracket as claimed in claim 1 wherein said support means comprises at least one leg portion formed integrally with and perpendicular to said planar surface and at least one foot portion formed integrally with said leg portion and parallel to said planar surface and being adapted for being secured to a respective said stud.

11. The bracket as claimed in claim 1 wherein said support means comprises at least one leg portion formed integrally with and perpendicular to and extending rearwardly of said planar surface and adapted to contact a wall board secured to said stud and thereby stiffen the support of said bracket.

12. A bracket for mounting apparatus within a wall between adjacent studs, comprising:
   (a) an elongated strut having two ends and a planar surface devoid of bends and adapted for mounting said apparatus;
   (b) support means at each end of said strut to support and secure said strut between said adjacent studs so that said planar surface is recessed with respect to a front surface of said studs and is positioned suitably for mounting said apparatus within said wall; and
   (c) said strut having at least one series of substantially conical screw tip receiving detents formed along a first line extending lengthwise of said planar surface;
   (d) at least one series of holes formed along a second line extending lengthwise of said planar surface and substantially parallel to said first line; and
   (e) wherein each of said holes is substantially oval and is formed having a long axis oriented generally widthwise of said strut.

13. A bracket for mounting apparatus within a wall between adjacent studs, comprising:
   (a) an elongated strut having two ends and a planar surface devoid of bends and adapted for mounting said apparatus;
   (b) support means at each end of said strut to support and secure said strut between said adjacent studs so that said planar surface is recessed with respect to a front surface of said studs and is positioned suitably for mounting said apparatus within said wall, said support means being formed of at least one end structure slidably mounted on and securable to at least one end of said strut to selectively lengthen and shorten the length of said bracket and is positioned suitably for being secured to at least one respective said stud; and
   (c) said strut having at least one series of substantially conical screw tip receiving detents formed along a line extending lengthwise of said planar surface.

14. A bracket for mounting apparatus within a wall between adjacent studs, comprising:
   (a) an elongated strut having two ends and a planar surface devoid of bends and adapted for mounting said apparatus;
   (b) support means at each end of said strut to support and secure said strut between said adjacent studs so that said planar surface is recessed with respect to a front surface of said studs and is positioned suitably for mounting said apparatus within said wall, said support means comprising at least one leg portion formed integrally with and perpendicular to said planar surface and at least one foot portion formed integrally with said leg portion and parallel to said planar surface and being adapted for being secured to a respective said stud, selected said leg and foot portions being adapted to being complementarily changed in length such that when said leg portion is greater in length said foot portion is less in length and configured such that the length of said leg portion is adapted to the depth of the apparatus being mounted on said bracket; and
   (c) said strut having at least one series of substantially conical screw tip receiving detents formed along a line extending lengthwise of said planar surface.

15. The bracket as claimed in claim 14 further comprising integrally formed guide means incorporated in said support means and configured to enable the complementary change in length of said leg portion and said foot portion and adapted to the depth of said apparatus being mounted on said bracket.

16. A bracket for mounting apparatus within a wall between adjacent studs, comprising:
   (a) an elongated strut having two ends and a planar surface devoid of bends and adapted for mounting said apparatus;
   (b) support means at each end of said strut to support and secure said strut between said adjacent studs so that said planar surface is recessed with respect to a front surface of said studs and is positioned suitably for mounting said apparatus within said wall, said support means comprising at least one leg portion formed integrally with and perpendicular to and extending rearwardly of said planar surface and adapted to contact a wall board secured to said stud and thereby stiffen the support of said bracket;
   (c) said strut having at least one series of substantially conical screw tip receiving detents formed along a line extending lengthwise of said planar surface; and
   (d) integrally formed guide means incorporated in said support means and configured to enable the complementary change in length of said leg portion and adapted to the depth of said apparatus being mounted on said bracket.

* * * * *